US006968919B2

(12) United States Patent  (10) Patent No.: US 6,968,919 B2
Shimizu et al.  (45) Date of Patent:  Nov. 29, 2005

(54) CABLE TYPE STEERING SYSTEM

(75) Inventors: Yasuo Shimizu, Saitama (JP); Koichi Suyama, Saitama (JP); Katsuji Watanabe, Saitama (JP); Atsuhiko Yoneda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/268,367

(22) Filed: Oct. 10, 2002

(65) Prior Publication Data
US 2003/0071449 A1   Apr. 17, 2003

(30) Foreign Application Priority Data
Oct. 16, 2001   (JP)   .................. P. 2001-317685

(51) Int. Cl.⁷ .............................. B62D 1/00; B62D 5/04
(52) U.S. Cl. ...................................... 180/444; 280/771
(58) Field of Search ................................ 180/405, 407, 180/443, 444, 446; 280/771, 93.513, 93.514, 280/93.515; 277/634–636; 464/173, 175; 74/18; 403/50, 51; 285/235–237; 428/36.9, 428/36.91

(56) References Cited

U.S. PATENT DOCUMENTS

| | | | | |
|---|---|---|---|---|
| 2,673,091 A | * | 3/1954 | Planalp | 280/103 |
| 3,669,466 A | * | 6/1972 | Spence | 180/409 |
| 4,047,494 A | * | 9/1977 | Scott | 440/42 |
| 4,054,102 A | * | 10/1977 | Borst et al. | 114/144 R |
| 4,066,147 A | * | 1/1978 | Toyomoto | 184/15.1 |
| 4,449,420 A | * | 5/1984 | Baba | 74/501.6 |
| 4,569,669 A | * | 2/1986 | Starling | 464/175 |
| 4,693,137 A | * | 9/1987 | Deligny | 74/501.5 R |
| 4,735,165 A | * | 4/1988 | Baba et al. | 114/144 R |
| 4,892,004 A | * | 1/1990 | Segura et al. | 74/501.5 R |
| RE34,852 E | * | 2/1995 | Burroughs | 440/63 |
| 5,770,286 A | * | 6/1998 | Sorkin | 428/36.9 |
| 5,809,840 A | * | 9/1998 | Oda et al. | 74/502.6 |
| 5,924,517 A | * | 7/1999 | Sugiura | 180/617 |
| 5,924,519 A | * | 7/1999 | Shimizu et al. | 180/444 |
| 5,996,723 A | * | 12/1999 | Shimizu et al. | 180/444 |
| 6,116,371 A | * | 9/2000 | Suyama et al. | 180/444 |
| 6,264,513 B1 | * | 7/2001 | Marsh | 440/53 |

FOREIGN PATENT DOCUMENTS

| | | | | |
|---|---|---|---|---|
| JP | 03129182 A | * | 6/1991 | .......... F16J 15/32 |
| JP | 07-301225 | | 11/1995 | |

(Continued)

*Primary Examiner*—Paul N. Dickson
*Assistant Examiner*—Laura B. Rosenberg
(74) *Attorney, Agent, or Firm*—Carrier, Blackman & Associates, P.C.; Joseph P. Carrier; William D. Blackman

(57) ABSTRACT

A cable type steering system includes an operation cable having an outer tube and inner cable slidably received in the outer tube. A drive pulley coupled to a steering wheel for rotation and a driven pulley coupled to a steering gear box for steering wheels for rotation are connected to end portions of the inner cable. A steering torque inputted to the steering wheel is transmitted to the steering gear box via the inner cable of the operation cable. At least one of a first portion of the system extending from the drive pulley to a first position of the outer tube and a second portion of the system extending from the driven pulley to a second position of the outer tube is accommodated within a waterproof space formed by a cover, such as a rubber cover or a cover molded of synthetic resin.

20 Claims, 8 Drawing Sheets

FOREIGN PATENT DOCUMENTS

| | | |
|---|---|---|
| JP | 08-002431 | 1/1996 |
| JP | 10-059197 | 3/1998 |
| JP | 2000-025623 | 1/2000 |
| JP | 2003-118605 | 4/2003 |

* cited by examiner

CABLE TYPE STEERING SYSTEM

BACKGROUND OF THE INVENTION

1. Field of the Invention

The present invention relates to a cable type steering system in which a steering wheel and a steering gear box are connected to each other with flexible operation cables, such as a Bowden cable. More particularly, the present invention relates to a cable type steering system having means or mechanisms for preventing water or other liquids from making contact with the operation cables.

2. Description of the Related Art

Cable type steering system are disclosed in, for example, JP-A-2000-25623, JP-A-10-59197 and JP-A-8-2431.

In this type of cable type steering system, a drive pulley and a driven pulley are accommodated in a drive pulley casing and a driven pulley casing, respectively. Then, ends of inner cables of operation cables are wound around the drive pulley and the driven pulley, and ends of outer tubes of the operation cables are fixed to the drive pulley casing and the driven pulley casing.

Since the driven pulley casing of the cable type steering system is disposed in an engine compartment of a vehicle, muddy water splashed by front wheels tends to adhere to the driven pulley casing. Moreover, since vibrations from the front wheels are transmitted to the driven pulley casing via tie rods, a connecting portion of the driven pulley casing and the outer tubes of the operation cables tends to become loosened. Thus, water penetrating from the loosened connecting portion may adhere to slide portions of the outer tubes and the inner cables of the operation cables. In addition, water penetrating from a joint or a gap in the driven pulley casing may also adhere to the slide portions. Thus, in the event that water adheres to the slide portions of the outer tubes and inner cables of the operation cables, there is caused a problem that water so adhering becomes frozen when the temperature is decreased, thereby interrupting the smooth operation of the cable type steering system, or a problem that rust is generated on the inner cables to thereby deteriorate the durability thereof.

In addition, although the drive pulley housing disposed on a dashboard exists in an environment which makes the penetration of water thereinto more difficult than the penetration of water into the driven pulley housing, the above problems can occur, for example, when a drink is spilt over the drive pulley housing by the driver or passenger in the passenger compartment.

SUMMARY OF THE INVENTION

The invention was made in view of the above situations, and an object thereof is to provide a cable type steering system in which water is prevented from contacting or adhering to slide portions of outer tubes and inter cables of operation cables of the cable type steering system.

With a view to attaining the object, according to a first aspect of the invention, there is provided a cable type steering system including operation cables having inner cables slidably received in outer tubes, in which end portions of the inner cables are connected, respectively, to a drive pulley coupled to a steering wheel for rotation and a driven pulley coupled to a steering gear box for steering wheels for rotation, whereby a steering torque inputted to the steering wheel is transmitted to the steering gear box via the inner cables of the operation cables. The cable type steering system of this first aspect of the invention is characterized in that at least one of a portion of the system extending from the drive pulley to predetermined positions on the outer tubes and a portion of the system extending from the driven pulley to predetermined positions on the outer tubes is accommodated within a waterproof closed space.

According to this first aspect, since the portion of the system extending from the drive pulley or the driven pulley to the predetermined positions on the outer tubes of the operation cables of the cable type steering system is accommodated in the waterproof closed space, the penetration and adherence of water to the slide portions of the outer tubes and the inner cables of the operation cables is prevented. As such, it is possible prevent the generation of operational failures of the cable type steering system due to freezing water adhering to the tubes and cables, and deterioration in durability of the inner cables due to rust generated by the water so adhering.

According to a second aspect of the invention, there is provided a cable type steering system as set forth in the first aspect of the invention, wherein at least one of a portion of the system extending from connecting portions for connecting the outer tubes to a drive pulley casing for accommodating therein the drive pulley to optional predetermined positions on the outer tubes and a portion of the system extending from connecting portions for connecting the outer tubes to a driven pulley casing for accommodating therein the driven pulley to optional predetermined positions on the outer tubes is covered with a rubber cover, such as a rubber cover or a cover molded of synthetic resin, which forms the waterproof space.

According to the construction this second aspect, since the rubber cover is adapted to cover from the connecting portions for connecting the outer tubes to the drive pulley casing to the optional predetermined positions on the outer tubes or from the connecting portions for connecting the outer tubes to the driven pulley casing to the optional predetermined positions on the outer tubes, it is possible to ensure the a waterproof seal of the connecting portions of the outer tubes from which water would otherwise penetrate most easily.

According to a third aspect of the invention, there is provided a cable type steering system as set forth in the first aspect of the invention, wherein at least one of a portion of the system extending from a drive pulley casing for accommodating therein the drive pulley to optional predetermined positions on the outer tubes connected to the drive pulley casing and a portion of the system extending from a driven pulley casing for accommodating therein the driven pulley to optional predetermined positions on the outer tubes connected to the driven pulley casing is covered with cover such as a rubber cover or a cover molded of synthetic resin, which forms the waterproof space.

According to the construction of this third aspect, since the rubber cover is adapted to cover from the drive pulley casing to the optional predetermined positions on the outer tubes or from the driven pulley casing to the optional predetermined positions on the outer tubes, it is possible not only to ensure the a waterproof seal of the connecting portions of the outer tubes from which water would otherwise penetrate most easily, but also to ensure further the prevention of the adherence of water to the slide portions of the operation cables by preventing the penetration of water from a joint and/or a gap in the drive pulley casing or the driven pulley casing.

According to a fourth aspect of the invention, there is provided a cable type steering system as set forth in the first aspect of the invention, wherein at least one of a covering portion extending from connecting portions for connecting the outer tubes to a drive pulley casing for accommodating therein the drive pulley to optional predetermined positions on the outer tubes and a covering portion extending from connecting portions for connecting the outer tubes to a driven pulley casing for accommodating therein the driven pulley to optional predetermined positions on the outer tubes is molded of a synthetic resin.

According to the construction, since the covering portion molded of synthetic resin mold is provided from the connecting portions of the outer tubes to the drive pulley casing to the optional predetermined positions on the outer tubes or from the connecting portions of the outer tubes to the driven pulley casing to the optional predetermined positions on the outer tubes, it is possible to ensure the a waterproof seal of the connecting portions of the outer tubes from which water would otherwise penetrate most easily.

According to a fifth aspect of the invention, there is provided a cable type steering system as set forth in the first aspect of the invention, wherein at least one of a covering portion extending from a drive pulley casing for accommodating therein the drive pulley to optional predetermined positions on the outer tubes connected to the drive pulley casing and a covering portion extending from a driven pulley casing for accommodating therein the driven pulley to optional predetermined positions on the outer tubes connected to the driven pulley casing is molded of a synthetic resin.

According to the construction of this fifth aspect, since the covering portion molded of synthetic resin mold is provided from the drive pulley casing to the optional predetermined positions on the outer tubes or from the driven pulley casing to the optional predetermined positions on the outer tubes, it is possible not only to ensure the a waterproof seal of the connecting portions of the outer tubes from which water would otherwise penetrate most easily, but also to ensure the prevention of the adherence of water to the slide portions of the operation cables by preventing the penetration of water from a joint and/or a gap in the drive pulley casing or the driven pulley casing.

DETAILED DESCRIPTION OF THE INVENTION

Modes for carrying out the invention will be described based on embodiments illustrated in the accompanying drawings.

Figure 1:
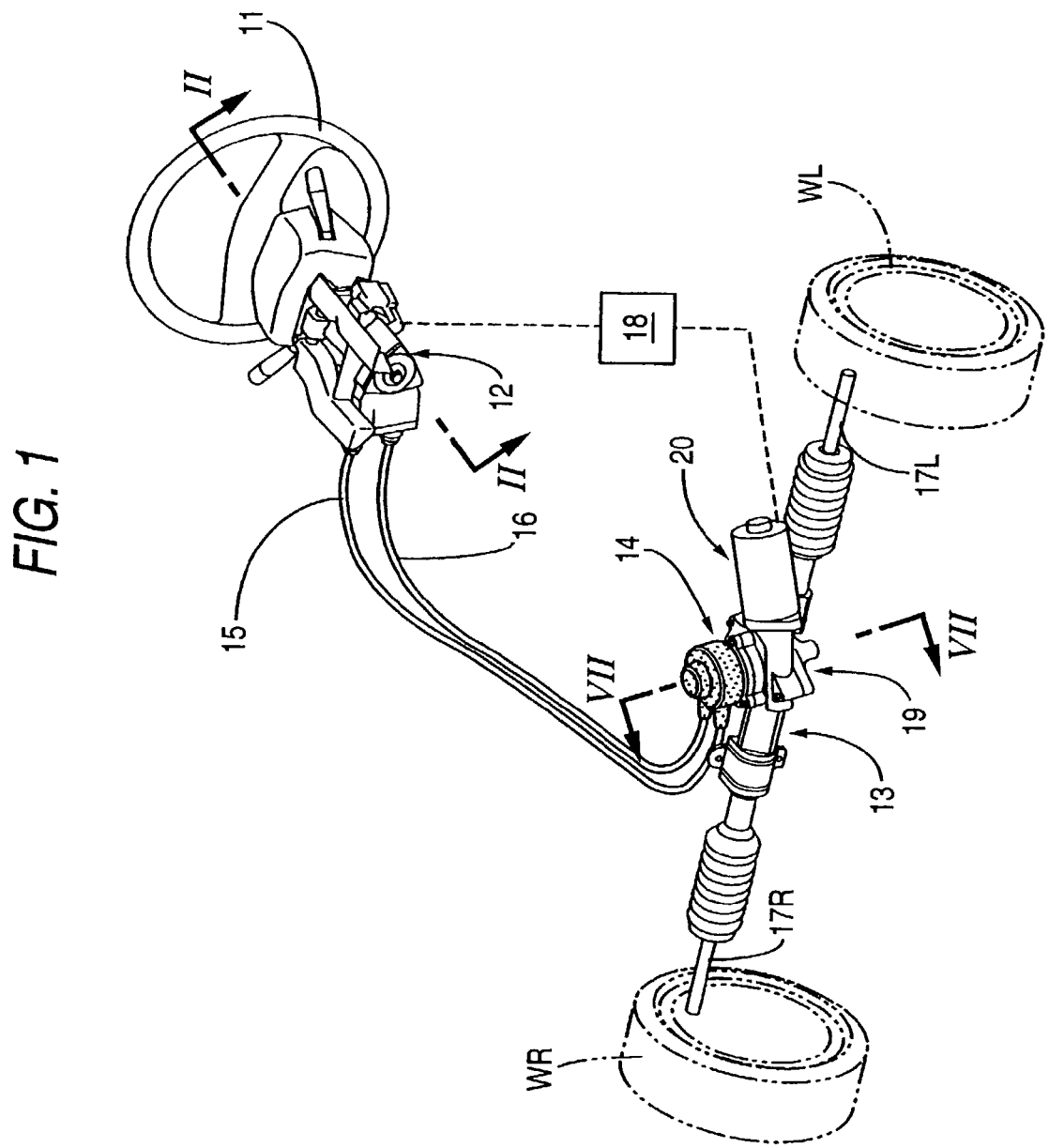
FIG. 1 is an overall perspective view of a cable type steering system.

FIGS. 1 to 7 show a first embodiment of the invention. As shown in FIG. 1, a drive pulley casing 12 provided in front of an automotive steering wheel 11 and a driven pulley casing 14 provided above a steering gear box 13 are connected to each other by two operation cables 15, 16 each comprising a Bowden cable. Tie rods 17L, 17R extending from end portions of the steering gear box 13 in transverse directions of a vehicle body are connected, respectively, to knuckles (not shown) which support left and right wheels WL, WR. A steering torque sensor is incorporated in the drive pulley casing 12 for detecting a steering torque which is inputted in the steering wheel 11. An actuator 20 provided in a gear casing 19 which is integral with the driven pulley casing 14 is actuated by a command from a control unit 18 into which a steering torque so detected by the steering torque sensor is inputted, so that the steering operation by the driver is assisted.

Figure 2:
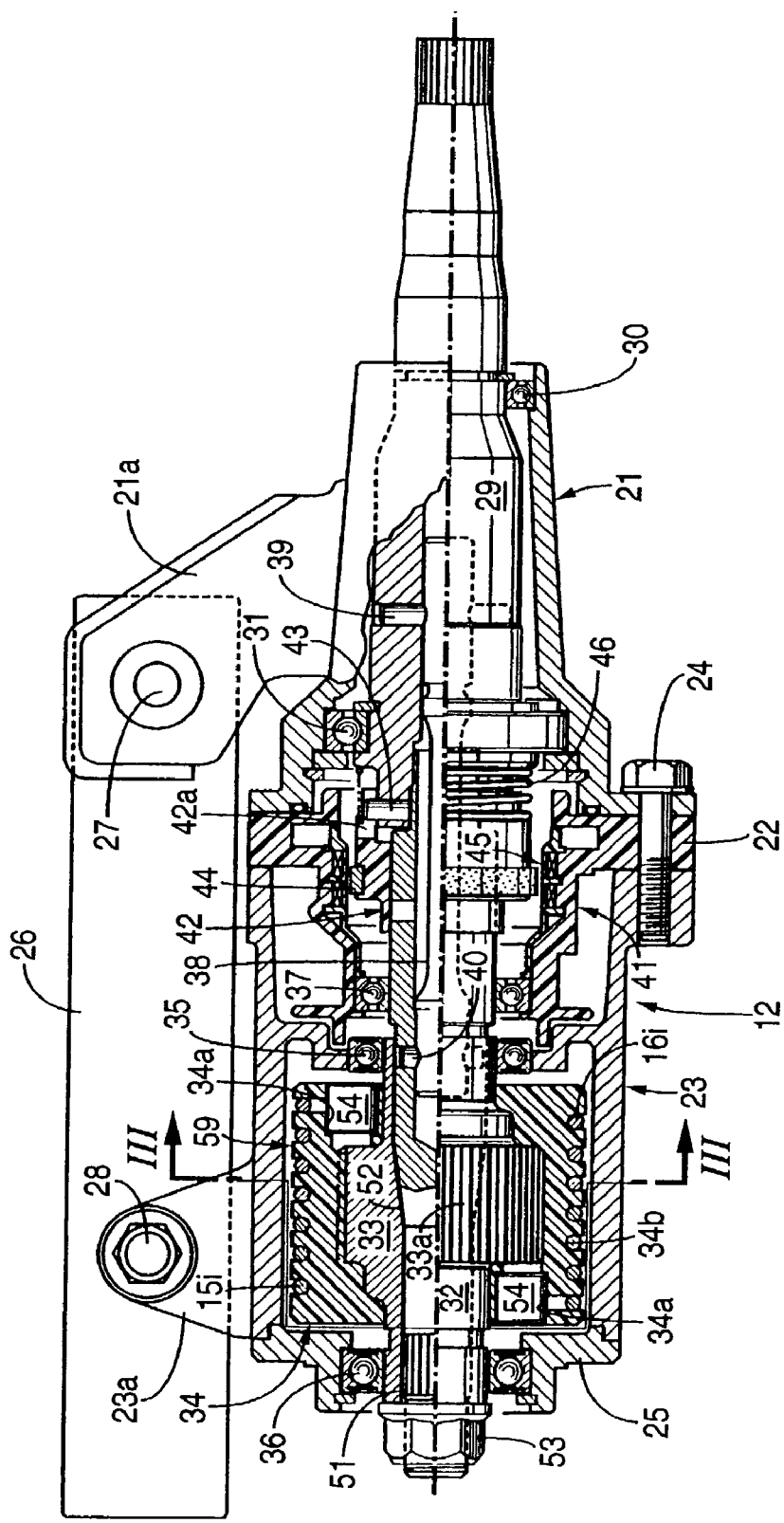
FIG. 2 is an enlarged sectional view taken along the line II—II in FIG. 1.

As shown in FIG. 2, the drive pulley casing 12 includes a rear housing 21, a center housing 22 and a front housing 23, which are connected together with bolts 24 . . . , and a front cover 25 is connected to a front face of the front housing 23 with bolts (not shown). The drive pulley casing 12 is mounted to a mount stay 26 such that a bracket 21a provided on the rear housing 21 is fixed to the mount stay 26 with a pin 27 whereas a bracket 23a provided on the front housing 23 is fixed to the mount stay 26 with a pin or bolt 28.

A hollow steering shaft 29 connected to the steering wheel 11 is rotatably supported in the rear housing 21 with two ball bearings 30, 31. A metallic pulley boss 33 is fixed to an outer circumference of a hollow pulley shaft 32 disposed coaxially with the steering wheel 11, and a drive pulley main body 34 which is formed of a synthetic resin is integrally molded in such a manner as to cover a serrated portion 33a formed in an outer circumference of the pulley boss 33. The pulley boss 33 is rotatably supported at end portions thereof by two ball bearings 35, 36 in the front housing 23 and the front cover 25, respectively, and the pulley shaft 32 is rotatably supported by a ball bearing 37 in the center housing 22. The pulley boss 33 and the drive pulley main body 34 construct a drive pulley 59 according to the invention.

An inner circumference of a front end portion of the steering shaft 29 fits in an outer circumference of a rear end portion of the pulley shaft 32 in such a manner as to rotate relative to the pulley shaft 32, and end portions of a torsion bar 38 fit in hollow portions of the steering shaft 29 and the pulley shaft 32, respectively, and are connected to the respective shafts with pins 39, 40. Consequently, a steering torque inputted into the steering shaft 29 is transmitted from the steering shaft 29 to the pulley shaft 32 via the torsion bar 38, whereby a steering torque sensor 41 provided in the interior of the center housing 22 detects the steering torque based on a twist amount of the torsion bar 38.

Figure 4:
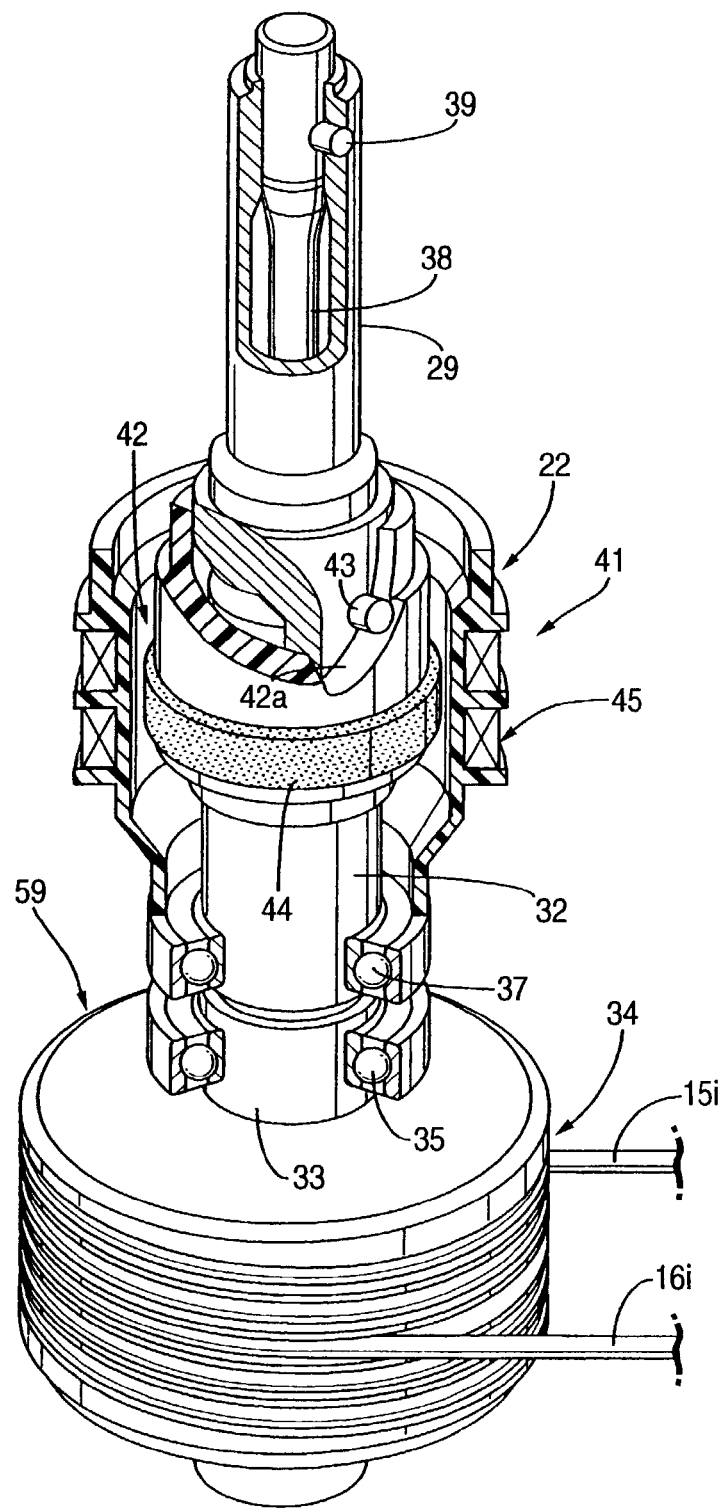
FIG. 4 is a perspective view of a steering torque sensor.

As is understood from FIGS. 2 and 4, the steering torque sensor 41 includes a cylindrical slider 42, a guide pin 43, a magnetic ring 44, a differential transformer 45 and a coil spring 46. The cylindrical slider 42 is supported on the pulley shaft 32 in such a manner as not to rotate relative to the outer circumference of the pulley shaft 32 but to slide in axial directions thereof. The guide pin 43 is fixed to the steering shaft 29 and adapted to fit in an inclined groove 42a formed in the slider 42. The magnetic ring 44 is fixed to an outer circumference of the slider 42 which is made of a synthetic resin. The differential transformer 45 is fixed to an inner circumference of the center housing 22 in such a manner as to confront the magnetic ring 44. The coil spring 46 biases the slider 42 to the front in order to prevent a looseness between the guide pin 43 and the inclined groove 42a.

Figure 5:
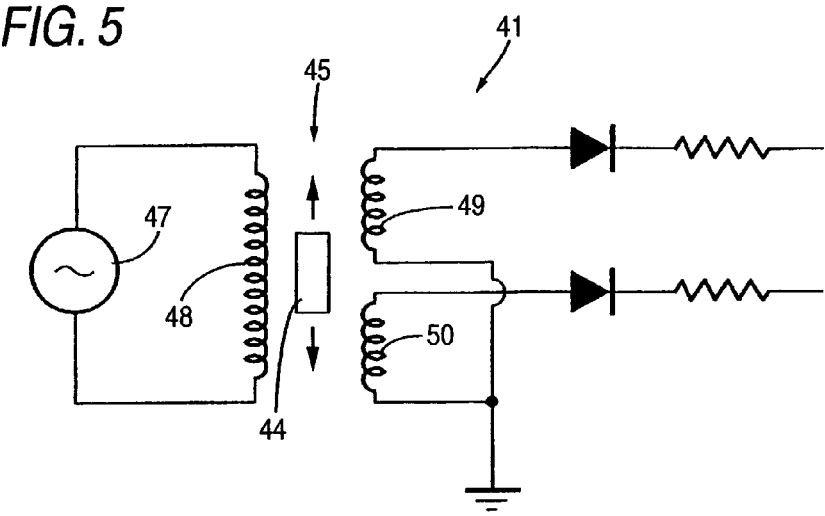
FIG. 5 is a circuit diagram of a differential transformer for the steering torque sensor.

As shown in FIG. 5, the differential transformer 45 of the steering torque sensor 41 comprises a primary coil 48 connected to an alternating-current power supply 47, a first secondary coil 49 and a second secondary coil 50. The magnetic ring 44 constitutes a movable iron core disposed between the first and second secondary coils 49, 50.

As is understood from FIG. 2, a front end portion of the pulley shaft 32 and the pulley boss 33 are connected to each other at a serrated connecting portion 51, as well as via a tapered connecting portion 52 which tapers toward the front end portion of the pulley shaft 32. A nut 53 is screwed on a front end of the pulley shaft 32, so that the pulley boss 33 is biased rearward along the pulley shaft 32 by virtue of a load from the nut 53, whereby the boss 33 is brought into close contact with the tapered connecting portion 52 with a sufficient surface pressure, thereby making it possible to bring the pulley shaft 32 and the pulley boss 33 into rigid integration. This serves to eliminate minute looseness existing at the serrated connecting portion 51, whereby not only can the generation of noise be suppressed, but also the steering feel can be improved. Since the drive pulley 59 can move axially when the nut 53 is tightened, the application of an unreasonable force to the drive pulley casing 12 is prevented.

Figure 3:
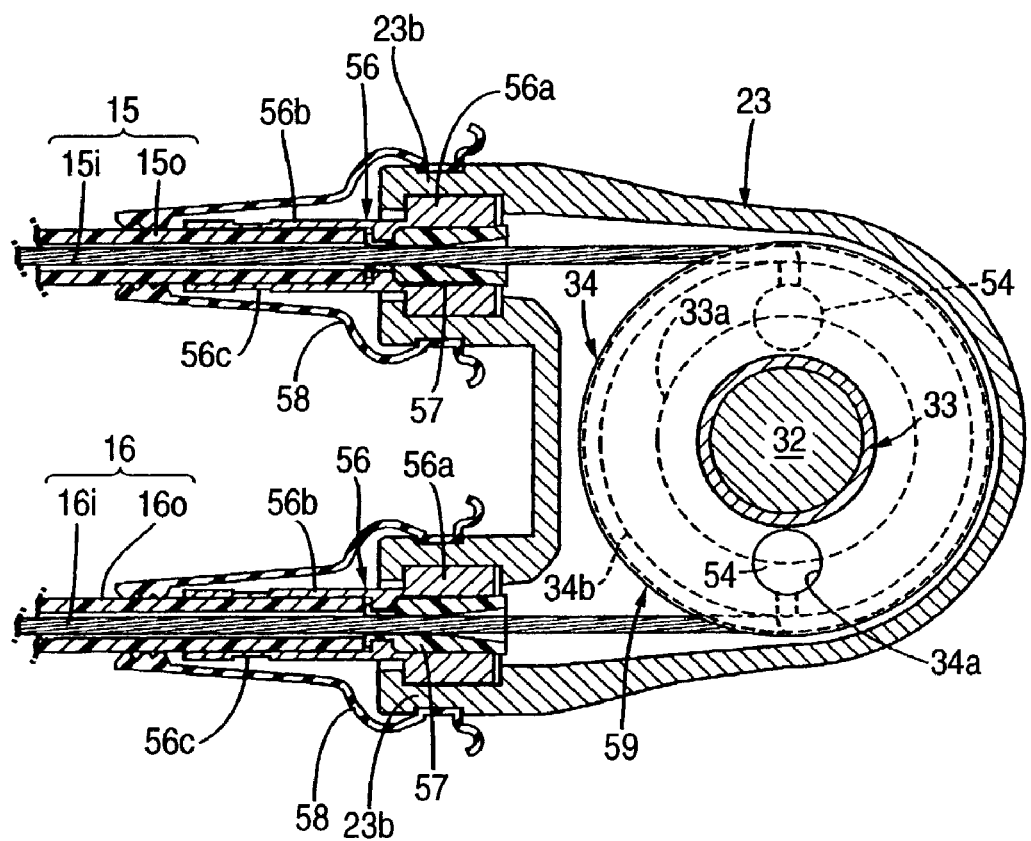
FIG. 3 is a cross-sectional view taken along the line III—III in FIG. 2.

As understood from FIGS. 2 and 3, the two operation cables 15, 16 are constituted by outer tubes 15o, 16o which are made of a synthetic resin, and inner cables 15i, 16i comprising metallic strands which are slidably received in the interior of the respective outer tubes 15o, 16o. Short cylindrical pins 54, 54 fixed to end portions of the two inner cables 15i, 16i fit in pin holes 34a, 34a formed in end faces of the drive pulley main body 34. The two inner cables 15i, 16i extending from the pins 54, 54 are wound around an outer circumference of the drive pulley main body 34 along a single spiral groove 34b formed in the outer circumference of the drive pulley main body 34 in directions in which the cables approach each other and are then drawn out in a direction which intersects with an axis of the pulley shaft 32 at right angles.

Bottom portions of the pin holes 34a, 34a of the drive pulley main body 34 made of, for example, synthetic resin reach a boundary portion between the serrated portion 33a of the pulley boss 33 and the drive pulley main body 34, and with the pins 54, 54 being removed, the boundary portion can easily be visualized. Consequently, the detection of a processing error can be ensured in which a drive pulley main body 34 is molded in an inappropriate condition where no serrated portion 33a is formed in a pulley boss 33.

Two cylindrical connecting portions 23b, 23b are formed on the front housing 23, and boss portions 56a, 56a of outer tube connecting members 56, 56 are fixed in the interior of the respective connecting portions 23b, 23b. Pipe portions 56b, 56b extending from the boss portions 56a, 56a outwardly of the connecting portions 23b, 23b fit on outer circumferences of the outer tubes 15o, 16o and the operation cables 15, 16 are clamped on clamp portions 56c, 56c, whereby end portions of the outer tubes 15o, 16o are fixed to the front housing 23. Guide bushes 57, 57 made of a synthetic resin providing good sliding characteristics are retained on inner circumferences of the boss portions 56a, 56a of the outer tube connecting members 56, 56 in order to prevent the direct abrasion of the inner cables 15i, 16i and the boss portions 56a, 56a.

Covers made from, for example, rubber 58, 58 cover from outer circumferences of the connecting portions 23b, 23b of the front housing 23 to predetermined positions (for example, to portions which are exposed from the pipe portions 56b, 56b of the outer tube connecting members 56, 56) on the outer tubes 15o, 16o of the operation cables 15, 26. The rubber covers 58, 58 having an elasticity are closely secured to the outer circumferences of the connecting portions 23b, 23b of the front housing 23 and outer circumferences of the outer tubes 15o, 16o to fluid-tightly seal off those portions, to thereby prevent water from penetrating from the clamp portions 56c, 56c of the outer tube connecting members 56, 56 of connecting the outer tubes 15o, 16o to the front housing 23, as well as gaps between the boss portions 56a, 56a of the outer tube connecting members 56, 56 and the connecting portions 23b, 23b.

Since the two ball bearings 35, 36 for supporting the pulley boss 33 are of a waterproof type, there is no risk that water penetrates into an interior space formed by the front housing 23 and the front cover 25 where the drive pulley 59 is accommodated to thereby get the drive pulley 59 wet. Thus, as has been described above, since the part extending from the drive pulley 59 to the predetermined positions of the outer tubes 15o, 16o is accommodated in the closed space, not only even in the event that the drive pulley casing 12 is disposed in an engine compartment of a vehicle and is splashed with water existing on the road surface, but also even in the event that the drive pulley casing 12 is disposed in a passenger compartment of the vehicle and is wetted by a drink spilt by the driver or passenger, it is possible to prevent the interruption of smooth motion of the operation cables 15, 16 that occurs when water or other liquid adheress to the slide portions of the outer tubes 15o, 16o and the inner cables 15i, 16i and is frozen thereat when the temperature is low, or the deterioration in durability of the operation cables 15, 16 that occurs when the inner cables 15i, 16i rust due to water or liquid so adhering thereto.

Figure 7:
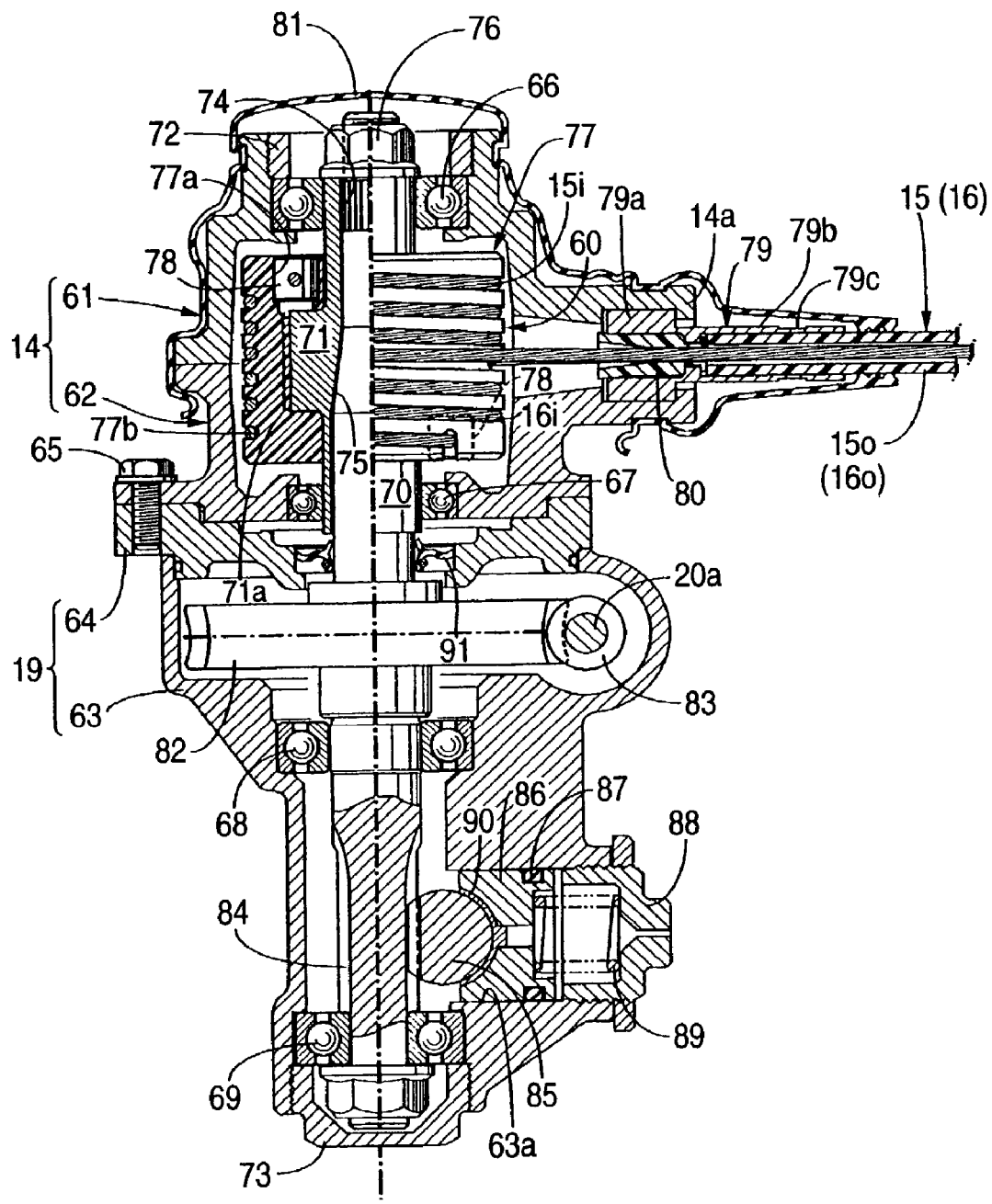
FIG. 7 is an enlarged sectional view taken along the line VII—VII in FIG. 1.

As shown in FIG. 7, the driven pulley casing 14 includes an upper housing 61 and a lower housing 62 which are connected to each other with bolts (not shown) and the gear casing 19 includes a gear casing main body 63 and an upper cover 64 which is connected to an upper face of the gear casing main body 63 with bolts (not shown) Then, the lower housing 62 and the upper cover 64 are connected together with a plurality of bolts 65.

A pulley shaft 70 is rotatably supported on a ball bearing 66 provided in the upper housing 61, a ball bearing 67 provided in the lower housing 62 and two ball bearings 68, 69 provided in the gear casing main body 63. The two ball bearings 66, 67 on an upper side do not directly bear the pulley shaft 70 but bear a pulley boss 71 fixed to an outer circumference of the pulley shaft 70. The ball bearing 66 provided in the upper housing 61 is prevented from coming off by an annular nut 72, and the lower ball bearing 69 provided in gear casing main body 63 is prevented from coming off by a cap nut 73.

An upper end portion of the pulley shaft 70 and the pulley boss 71 are connected together at a serrated connecting portion 74, as well as via a taper connecting portion 75 which tapers toward the upper end portion of the pulley shaft 70. A nut 76 is screwed on an upper end of the pulley shaft 70, and the pulley boss 71 is biased downwardly along the pulley shaft 70 by virtue of a load from the nut 76, so that the taper connecting portion 75 is brought into close contact with the pulley shaft 70 with a sufficient surface pressure, whereby the pulley shaft 70 and the pulley boss 71 are brought into rigid integration. Thus, not only can the generation of noise be suppressed by eliminating minute looseness existing at the serrated connecting portion, but also the steering feel can be improved. Since the driven pulley 60 is allowed to move in an axial direction when the nut 76 is tightened, the application of an unreasonable force to the driven pulley casing 14 and the gear casing 19 can be prevented.

A driven pulley main body 77 made of a synthetic resin is integrally molded on the serrated portion 71a of an outer circumference of the pulley boss 71. Short cylindrical pins 78, 78 fixed to end portions of the inner cables 15i, 16i of the two operation cables 15, 16 fit in pin holes 77a, 77a formed in both end faces of the driven pulley main body 77. The two inner cables 15i, 16i extending from the pins 78, 78 are wound around an outer circumference of the driven pulley main body 77 along a spiral groove 77b formed in the outer circumference of the driven pulley main body 77 in directions in which the inner cables 15i, 16i approach each other and are then drawn out in a direction which intersects with an axis of the pulley shaft 70 at right angles. The pulley boss 71 and the driven pulley main body 77 constitute a driven pulley 60.

Bottom portions of the pin holes 77a, 77a in the driven pulley main body 77 made of synthetic resin reach a boundary portion between the serrated portion 71a of the pulley boss 71 and the driven pulley main body 77, and with the pins 78, 78 being removed, the boundary portion can easily be visualized. Consequently, the detection of a processing error can be ensured in which a driven pulley main body 77 is molded in a condition where a serrated portion 71a is not formed in a pulley boss 71.

Two cylindrical connecting portions 14a, 14a are formed on the driven pulley casing 14, and boss portions 79a, 79a of outer tube connecting members 79, 79 are fixed inside the connecting portions 14a, 14a, respectively. Pipe portions 79b, 79b extending from the boss portions 79a, 79a to the outside of the connecting portions 14a, 14a fit on outer circumferences of outer tubes 15o, 16o and the operating cables 15, 16 are clamped on clamp portions 79c, 79c, whereby end portions of the outer tubes 15o, 16o are fixed to the driven pulley casing 14. Guide bushes 80, 80 made of a synthetic resin providing good sliding characteristics are retained on an inner circumference of the boss portions 79a, 79a of the outer tube connecting members 79, 79 for preventing the direct abrasion of the inner cables 15i, 16i and the boss portions 79a, 79a.

A single rubber cover 81 covers from most of the driven pulley casing 14 to predetermined positions (for example, to portions which are exposed front the pipe portions 79b, 79b of the outer tube connecting members 79, 79) of the outer tubes 15o, 16o of the operation cables 15, 16 via the connecting portions 14a, 14a. This rubber cover 81 can not only ensure the sealing of the clamp portions 79c, 79c of the outer tube connecting members 79, 79 from which water penetrates most easily, but also prevents the penetration of water from a split face between the upper housing 61 and the lower housing 62 of the driven pulley casing 14, and the ball bearing 66 which supports the upper end of the pulley shaft 70.

With this construction, the waterproofless of the driven pulley casing 14, which is disposed at a lower portion in the engine compartment and hence is more likely to get wet than the drive pulley housing 12, can be increased, whereby it is possible to prevent the interruption of smooth movement of the operation cables 15, 16 that occurs when water adheres to the slide portions of the outer tubes 15o, 16o and the inner cables 15i, 16i and is then frozen when the temperature is decreased, and prevent the deterioration in durability of the operation cables 15, 16 that occurs when the inner cables 15i, 16i get rusted due to the water so adhering to the slide portions of the inner cables 15i, 16i.

A worm wheel 82 fixed to the pulley shaft 70 meshes with a worm 83 fixed to an output shaft 20a of the actuator 20 (refer to FIG. 1) which is constituted by an electric motor, at an upper portion of the gear casing 19 which is sealed off from the driven pulley casing 14 via a seal member 91. A rack 85 formed on the steering gear box 13 (refer to FIG. 1) meshes with a pinion 84 formed on a lower portion of the pulley shaft 70, and the rack 85 is biased toward the pinion 84 at the meshing portion.

Namely, a slide member 86 slidably fits in a through hole 63a formed in the gear casing main body 63 via an O ring 87, and a low-friction member 90 provided on the slide member 86 is brought into abutment with a back of the rack 85 by virtue of the spring force of a coil spring 89 disposed between a spring seat 88 screw-connected in the through hole 63a and the slide member 86. Accordingly, the rack 85 is prevented from being subjected to a large magnitude of sliding resistance and therefore, no looseness and deflection thereof is generated when the rotation of the pulley shaft 70 is transmitted to the rack 85 via the pinion 84 to steer the wheels WL, WR, the smooth operation of the rack 85 being thereby made possible.

Next, the function of the embodiment of the invention which is constructed as has been described heretofore will be described.

A steering torque detected by the steering torque sensor 41 is inputted in the control unit 18, which controls the operation of the actuator 20 based on the steering torque so detected. Namely, when the steering wheel 11 is operated to turn the vehicle, as shown in FIG. 2, the steering torque is transmitted to the pulley shaft 32 via the steering shaft 29 and the torsion bar 38, and one of the inner cables 15i, 16i of the operation cables 15, 16 which are wound around the drive pulley main body 34 is pulled whereas the other of the inner cables 15i, 16i is loosened, whereby the rotation of the drive pulley 59 is transmitted to the driven pulley 60. As a result, the pulley shaft 70 shown in FIG. 7 rotates, and the steering torque is transmitted to the wheels WL, WR via the pinion 84 and the rack 85 within the steering gear box 13 and the tie rods 17L, 17R.

When no steering torque is inputted to the steering wheel 11 the torsion bar 38 neither twists nor deforms, and the steering shaft 29 and the pulley shaft 32 are held in the same phase. As this occurs, as shown in FIG. 6B, the guide pin 43 of the steering shaft 29 is situated at the center of the inclined groove 42a, and the slider 42 is held at a vertically central position. Then, as shown in FIG. 5, the magnetic ring 44 provided on the slider 42 is situated at an intermediate position between the first secondary coil 49 and the second secondary coil 50, whereby output voltages from the two secondary coils 49, 50 becomes equal, and the steering torque is detected as being zero.

Figure 6A:
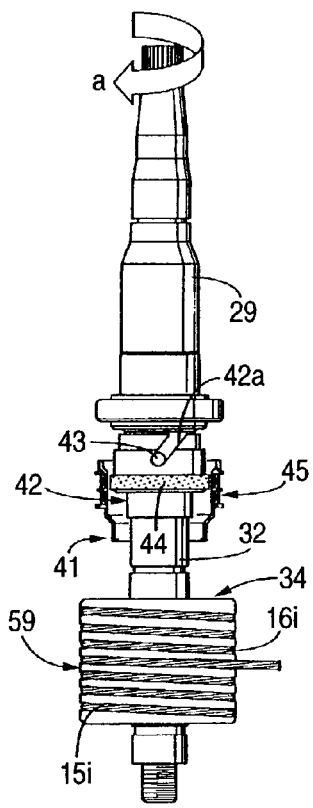
FIGS. 6A to 6C are explanatory views explaining the function of the steering torque sensor.
Figure 6B:
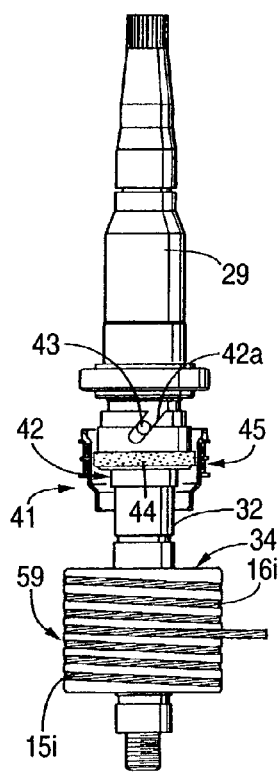
Figure 6C:
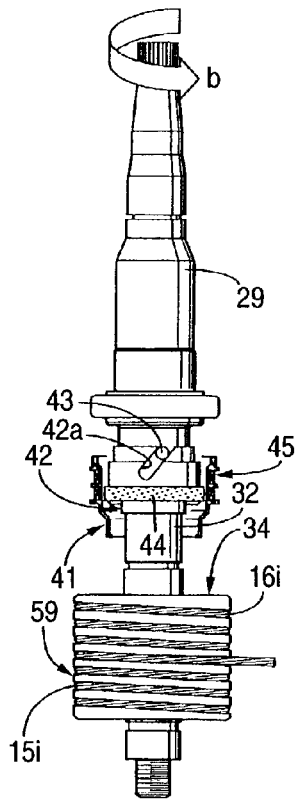

In addition, when the steering wheel 11 is operated rightward so that a steering torque in a direction indicated by an arrow a shown in FIG. 6A is inputted to the steering shaft 29, the torsion bar 38 twists and deforms and a difference in phase is generated between the steering shaft 29 and the pulley shaft 32 (namely, the slider 42 which cannot rotate relative to the pulley shaft 32), whereby the slider 42 is pushed along the inclined groove 42a by the guide pin 43 of the steering shaft 29 to slide upwardly. As a result, the output voltage of the upper first secondary coil 49 increases whereas the output voltage of the lower second secondary coil 50 decreases, and the steering torque which is directed to the right is detected based on a difference in voltage between the two coils. Similarly, when the steering wheel is operated leftward so that a steering torque in a direction indicated by an arrow b shown in FIG. 6C is inputted to the steering shaft 29, the torsion bar 38 twists and deforms and a difference in phase is generated between the steering shaft 29 and the pulley shaft 32 (namely, the slider 42), whereby the slider 42 is pushed along the inclined groove 42a by the guide pin 43 of the steering shaft 29 to slide downwardly. As a result, the output voltage of the upper first secondary coil 49 decreases whereas the output voltage of the lower second secondary coil 50 increases, and the steering torque which is directed to the left is detected based on a difference in voltage between the two coils.

Thus, when a steering torque is detected by the steering torque sensor 41, the control unit 18 drives the actuator 20 such that the steering torque detected by the steering torque sensor 41 is held at a pre-set steering torque, whereby the torque of the actuator 20 is transmitted to the pulley shaft 70 via the worm 83 and the worm wheel 82 to thereby assist the steering wheel operation or steering effort by the driver. By the combination of the steering torque sensor 41 having the differential transformer 45 and the actuator 20, the actuator 20 can be operated only through electric control, whereby the construction of the control system can be simplified.

Next, referring to FIGS. 8 and 9, a second embodiment of the invention will be described.

While the rubber covers 58, 81 are used to provide the waterproofness to the drive pulley casing 12 and the driven pulley casing 14 in the first embodiment described above, in a second embodiment, the required waterproof function is designed to be obtained by utilizing synthetic resin molded portions 58', 81' which are directly molded on the surfaces of portions to be sealed, instead of the rubber covers 58, 81.

Figure 8:
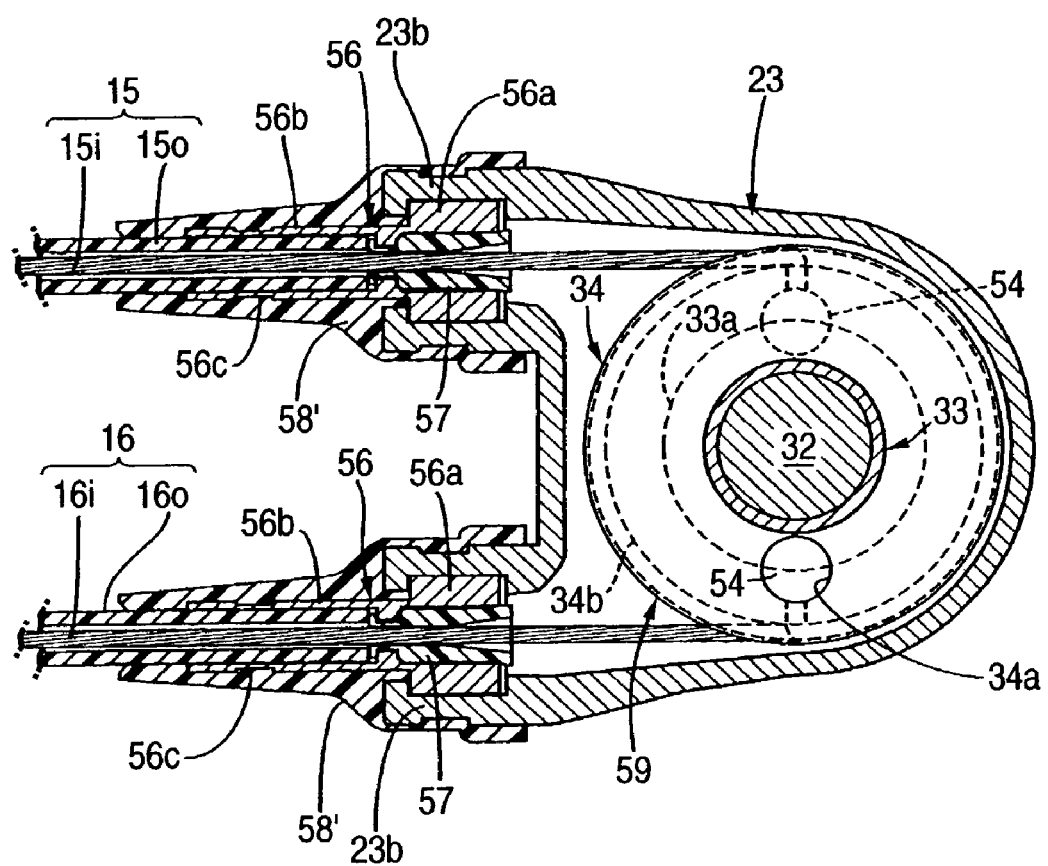
FIG. 8 is a view showing a second embodiment of the invention, which corresponds to FIG. 3.
Figure 9:
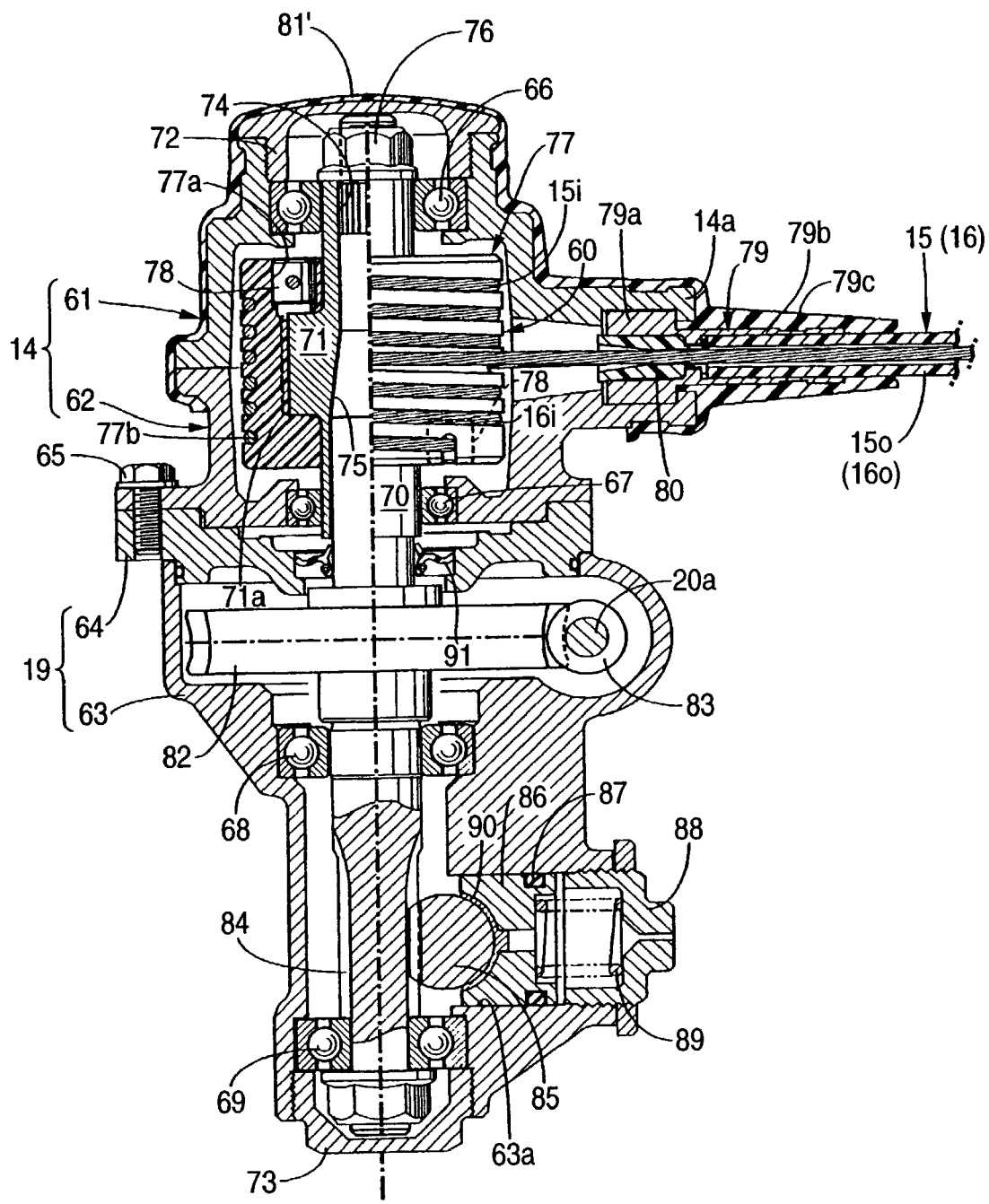
FIG. 9 is a view showing the second embodiment of the invention, which corresponds to FIG. 7.

Portions of a drive pulley casing 12 shown in FIG. 8, which correspond to those covered with the rubber covers 58, are now covered with the synthetic resin molded portions 58' and a higher waterproofness can be exhibited by adopting the synthetic resin molded portions 58' which are made of a synthetic resin providing a higher sealing performance. Similarly, a portion of a driven pulley casing 14 shown in FIG. 9, which corresponds to that covered with the rubber cover 81, is covered with the synthetic resin formed portion 81', and a higher waterproofness can be exhibited by adopting the synthetic resin formed portion 81' which is made of a synthetic resin providing a higher sealing performance.

Thus, while the embodiments of the invention have been described in detail above, the invention may be modified variously with respect to its design without departing from the spirit and scope of the invention.

For example, while both the drive pulley casing 12 and the driven pulley casing 14 are covered with the rubber covers 58, 81 or the synthetic resin formed portions 58', 81' in the embodiments, only one of the drive pulley casing 12 and the driven pulley casing 14 maybe covered therewith. In addition, suitable materials other than rubber and synthetic resin that provide a waterproof function may be used.

Thus, according to the first aspect of the invention, since the portion of the system extending from the drive pulley or the driven pulley to the optional predetermined positions on the outer tubes of the operation cables of the cable type steering system is accommodated in the waterproof closed space having the waterproofness, the penetration and adherence of water to the slide portions of the outer tubes and the inner cables of the operation cables is prevented, whereby it is possible to surely prevent the generation of operational failures of the cable type steering system due to the freezeing of the water so adhering, and prevent deterioration in durability of the inner cables due to rust generated by the water so adhering.

According to the second aspect of the invention, since the rubber cover is adapted to cover from the connecting portions for connecting the outer tubes with the drive pulley casing to the optional predetermined positions of the outer tubes or from the connecting portions for connecting the outer tubes with the driven pulley casing to the optional predetermined positions on the outer tubes, it is possible to surely seal the connecting portions of the outer tubes from which water would otherwise penetrate most easily.

According to the third aspect of the invention, since the rubber cover is adapted to cover from the drive pulley casing to the optional predetermined positions on the outer tubes or from the driven pulley casing to the optional predetermined positions on the outer tubes, it is possible not only to surely seal the connecting portions of the outer tubes from which water would otherwise penetrate most easily, but also to surely prevent water from adhering to the slide portions of the operation cables by preventing the penetration of water from a joint and/or a gap in the drive pulley casing or the driven pulley casing.

According to the fourth aspect of the invention, since the covering portion molded of synthetic resin mold is provided from the connecting portions of the outer tubes with the drive pulley casing to the optional predetermined positions on the outer tubes or from the connecting portions of the outer tubes with the driven pulley casing to the optional predetermined positions on the outer tubes, it is possible to surely seal the connecting portions of the outer tubes from which water would otherwise penetrate most easily.

According to the fifth aspect of the invention, since the covering portion molded of synthetic resin mold is provided from the drive pulley casing to the optional predetermined positions on the outer tubes or from the driven pulley casing to the optional predetermined positions on the outer tubes, it is possible not only to surely seal the connecting portions of the outer tubes from which water would otherwise penetrate most easily, but also to surely prevent water from adhering to the slide portions of the operation cables by preventing the penetration of water from a joint and/or a gap in the drive pulley casing or the driven pulley casing.

What is claimed is:

1. A cable steering system comprising:
   an operation cable including an outer tube and an inner cable slidably received in the outer tube;
   a drive pulley coupled to a steering wheel for rotation, the drive pulley being connected to one end portion of the inner cable;
   a driven pulley coupled to a steering gear box for steering wheels for rotation, the driven pulley being connected to the other end portion of the inner cable;
   a drive pulley casing accommodating the drive pulley therein and having a first connecting portion connecting the outer tube thereto; and
   a driven pulley easing accommodating the driven pulley therein and having a second connecting portion connecting the outer tube thereto;
   wherein a steering torque inputted to the steering wheel is transmitted to the steering gear box via the inner cable of the operation cable;
   wherein at least one of a first portion of the system extending from the drive pulley to a first position of the outer tube and a second portion of the system extending from the driven pulley to a second position of the outer tube is accommodated within a waterproof space; and the waterproof space is formed by at least one cover covering at least one of the first portion of the system, the cover directly contacting and extending from the first connecting portion of the drive pulley casing to directly contact the first position of the outer tube, and the second portion of the system, the cover directly contracting and extending from the second connecting portion of the driven pulley casing to directly contact the second position of the outer tube, the contacting portions of the cover providing a seal which waterproofs the waterproof space.

2. The cable steering system according to claim 1, wherein the at least one cover is molded of at least one of rubber and synthetic resin.

3. The cable steering system according to claim 2, wherein said cover is molded directly onto said at least one of the first portion of the system and the second portion of the system.

4. The cable steering system according to claim 2, wherein said at least one cover is impervious to water and is shaped to enclose a connecting portion between an end section of the outer tube and at least one of the drive pulley casing and the driven pulley casing.

5. The cable steering system according to claim 1, wherein said waterproof space is formed by two of said covers respectively covering said first portion of the system and said second portion of the system.

6. The cable steering system of claim 1, further comprising at least one outer tube connecting member attached to at least one of said drive pulley casing at said first connecting portion and said driven pulley casing at said second connecting portion, wherein an end portion of said outer tube outside of said drive and driven pulley casings is received within said at least one outer tube connecting member, wherein a covering seal member encloses a portion of said outer tube connecting member which extends outside of said drive pulley casing.

7. The cable steering system according to claim 1, wherein said first portion of the system includes an end section of the outer tube extending outside of and away from the drive pulley casing and said second portion of system includes another end section of the outer tube extending outside of and away from the driven pulley casing.

8. The cable steering system according to claim 1, wherein said at least one cover encloses an end portion of the outer tube extending outwardly of and connected to one of the drive pulley casing and the driven pulley casing, and also encloses a portion of the one of the drive pulley casing and the driven pulley casing to prevent water from entering between the outer tube and the one of the drive pulley casing and the driven pulley casing.

9. The cable steering system according to claim 8, wherein said at least one cover encloses an upper portion of the one of the drive pulley casing and the driven pulley casing.

10. A cable steering system comprising:

an operation cable having an outer tube and inner cable slidably received in the outer tube, wherein at least a portion of the outer tube is accommodated within a waterproof space formed by a cover, the cover covering, and being in sealing direct with, said portion of the outer tube and at least one of at least a portion of a drive pulley casing and at least a portion of a driven pulley casing of the steering system, the cover providing a seal to prevent water from entering between the outer tube and said at least one of at least the portion of the drive pulley casing and at least the portion of the driven pulley casing.

11. The cable steering system according to claim 10, wherein the waterproof space formed by said at least one cover additionally covers at least one of a connecting portion that connects the outer tube to the drive pulley casing and a connecting portion that connects the outer tube to the driven pulley casing.

12. The cable steering system according to claim 10, wherein the waterproof space is formed by a cover formed of at least one of rubber and synthetic resin.

13. The cable steering system according to claim 12, wherein said at least one cover is impervious to water and is shaped to enclose a connecting portion between an end section of the outer tube and at least one of the drive pulley casing and the driven pulley casing.

14. The cable steering system according to claim 10, wherein said waterproof space is formed by a plurality of said covers covering at least the portion of a drive pulley casing, at least the portion of a driven pulley casing of the steering system, and portions of the outer tube connected to said drive pulley casing and said driven pulley casing system to prevent water from entering between the outer tube and at least the portion of the drive pulley casing, and between the outer tube and at least the portion of the driven pulley casing.

15. The cable steering system according to claim 10, wherein said cover is molded directly onto said at least one of at least the portion of the drive pulley casing and at least the portion of the driven pulley casing.

16. The cable steering system according to claim 10, wherein said portion of the outer tube extends outside of and away from said at least one of the portion the drive pulley casing and the portion of the driven pulley casing covered by said cover.

17. The cable steering system according to claim 16, wherein said cover encloses said portion of the outer tube, said at least one of the portion of the drive pulley casing and the portion of the driven pulley casing, and at least one of a connecting portion that connects the outer tube to the drive pulley casing and a connecting portion that connects the outer tube to the driven pulley casing.

18. The cable steering system according to claim 10, wherein said portion of the outer tube extends outside of and away from said at least one of the portion the drive pulley casing and the portion of die driven pulley casing covered by said cover, said cover encloses said portion of said outer tube and an upper portion of at least one of the drive pulley casing and the driven pulley casing.

19. A cable steering system comprising:

an operation cable including an outer tube and an inner cable slidably received in the outer tube;

a drive pulley coupled to a steering wheel for rotation and disposed in a drive pulley casing, the drive pulley being connected to one end portion of the inner cable;

a driven pulley coupled to a steering gear box for steering wheels for rotation and disposed in a driven pulley casing, the driven pulley being connected to the other end portion of the inner cable; and a waterproof cover directly contacting at least one of a portion of a drive pulley casing and a portion of a driven pulley casing together with at least a portion of the outer tube to provide a waterproof seal which prevents water from entering between the outer tube and said at least one of the portion of the drive pulley casing and the portion of the driven pulley easing.

20. The cable steering system according to claim 19, including two of said waterproof covers, with one of said covers enclosing the portion of the drive pulley casing and an end portion of the outer tube extending outwardly of the portion of a drive pulley casing, and the other of said covers enclosing the portion of the driven pulley casing and an opposite end portion of the outer tube extending outwardly of the portion of a driven pulley casing.

* * * * *

UNITED STATES PATENT AND TRADEMARK OFFICE
CERTIFICATE OF CORRECTION

| | |
|---|---|
| PATENT NO. | : 6,968,919 B2 |
| APPLICATION NO. | : 10/268367 |
| DATED | : November 29, 2005 |
| INVENTOR(S) | : Shimizu et al. |

It is certified that error appears in the above-identified patent and that said Letters Patent is hereby corrected as shown below:

Title page,
Item [56], References Cited, U.S. PATENT DOCUMENTS, change
"5,924,517 A *    7/1999    Sugiura    180/617" to
-- 5,924,517 A *    7/1999    Sugiura    180/417 --.

Column 1,
Line 14, change "steering system are" to -- steering systems are --.
Line 55, change "and inter cables" to -- and inner cables --.

Column 2,
Line 13, change "possible prevent" to -- possible to prevent --.
Lines 38 and 58, change "the a waterproof" to -- a waterproof --.

Column 3,
Lines 15 and 34, change "the a waterproof" to -- a waterproof --.

Column 6,
Line 7, change "26" to -- 16 --.
Line 13, change "56, 56 of connecting" to -- 56, 56 for connecting --.
Line 32, change "liquid adheress" to -- liquid adheres --.

Column 7,
Line 49, change "exposed front" to -- exposed from --.
Line 60, change "waterproofless" to -- waterproofness --.

Column 9,
Line 56, change "maybe covered" to -- may be covered --.

Column 10,
Line 1, change "freezeing" to -- freezing --.
Line 59, change "easing accommodating" to -- casing accommodating --.

Column 11,
Line 9, change "directly contracting" to -- directly contacting --.
Line 43, change "portion of system" to -- portion of the system --.
Line 63, change "direct with" to -- direct contact with --.

UNITED STATES PATENT AND TRADEMARK OFFICE
CERTIFICATE OF CORRECTION

PATENT NO. : 6,968,919 B2
APPLICATION NO. : 10/268367
DATED : November 29, 2005
INVENTOR(S) : Shimizu et al.

It is certified that error appears in the above-identified patent and that said Letters Patent is hereby corrected as shown below:

Column 12,
Lines 33 and 45, change "portion the drive pulley" to -- portion of the drive pulley --.
Line 46, change "portion of die" to -- portion of the --.
Line 67, change "driven pulley easing" to -- driven pulley casing --.

Signed and Sealed this

Eleventh Day of July, 2006

JON W. DUDAS
*Director of the United States Patent and Trademark Office*